United States Patent [19]
Liljenberg

[11] 3,919,931
[45] Nov. 18, 1975

[54] APPARATUS FOR INJECTING FLUID INTO PIERCEABLE, FLUID-PERMEABLE BODIES

[75] Inventor: Knud Liljenberg, Kolding, Denmark

[73] Assignee: Slagteriernes Faellesindkobsforening A.m.b.A., Hvidovre, Denmark

[22] Filed: Dec. 11, 1973

[21] Appl. No.: 423,656

[52] U.S. Cl. .................................. 99/533; 99/535
[51] Int. Cl.² ........................................ A23B 4/02
[58] Field of Search ........................ 99/532–536; 137/115, 557

[56] References Cited
UNITED STATES PATENTS

| | | | |
|---|---|---|---|
| 2,645,172 | 7/1953 | Allbright | 99/533 |
| 2,674,179 | 4/1954 | Harrington | 99/533 |
| 2,821,901 | 2/1958 | Abrams | 99/533 |
| 3,590,721 | 7/1971 | Hoffmann | 99/533 |
| 3,651,827 | 3/1972 | Hammer | 137/557 |

*Primary Examiner*—Harvey C. Hornsby
*Assistant Examiner*—James A. Niegowski
*Attorney, Agent, or Firm*—Dennison, Dennison, Meserole, & Pollack

[57] ABSTRACT

A method and apparatus for introducing a fluid such as brine into pierceable, fluid-permeable bodies, such as meat bodies, moving along a predetermined path. The fluid is being introduced through an arrangement of hollow needles reciprocating into and out of engagement with the meat bodies and having fluid discharge openings adjacent to the needle points. The reciprocating movement is preferably performed at a substantially uniform rate without any considerable dwelling when the movement of the needles penetrated into the meat bodies is reversed. A number of stripping members arranged in side-by-side relationship are preferably separately movable up and down in relation to the conveyor so as to prevent the meat bodies from following the needles when they are moved out of engagement with said bodies. Means may be provided for interrupt supply of fluid to the needles as soon as they have been moved out of engagement with all of the meat bodies and to resume supply of fluid or brine immediately before one or more of the needles penetrate into the highest body. Furthermore, means may be provided for indicating clogging of one or more of the needles and for facilitating replacement of the same.

16 Claims, 11 Drawing Figures

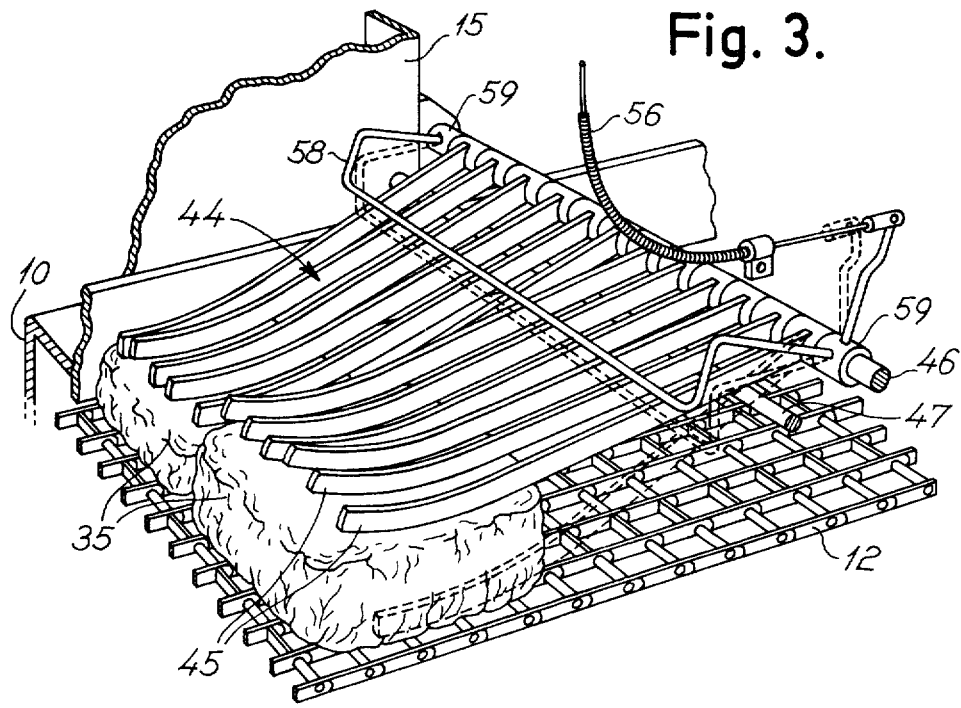
Fig. 3.
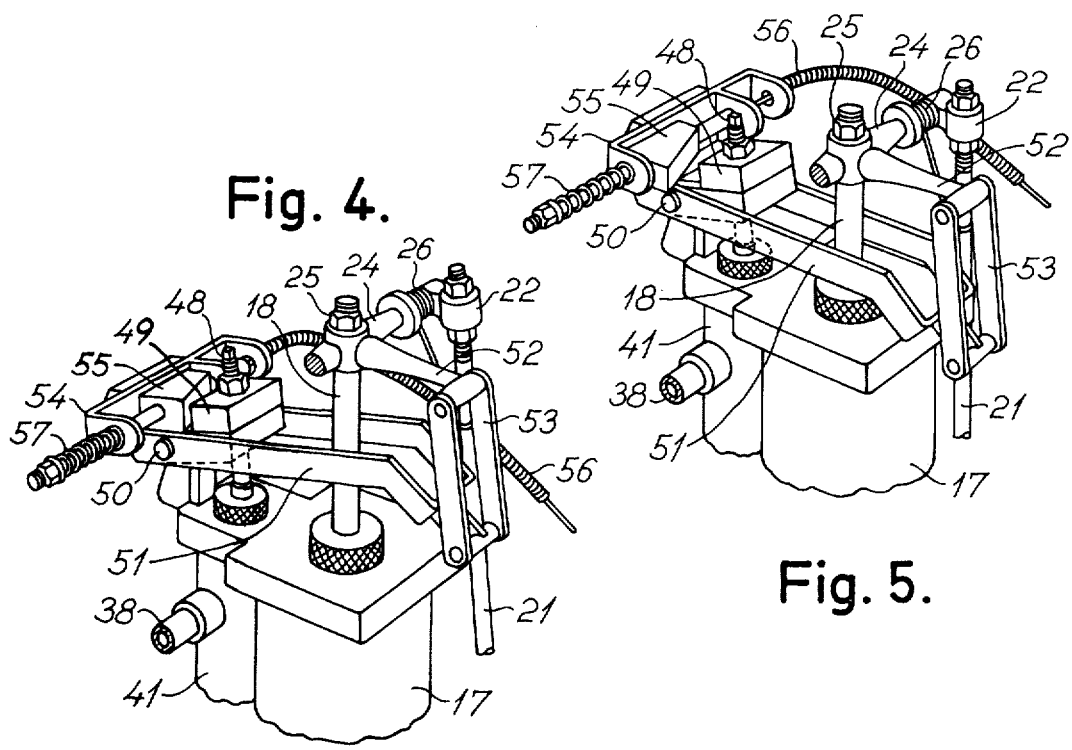
Fig. 4.
Fig. 5.

APPARATUS FOR INJECTING FLUID INTO PIERCEABLE, FLUID-PERMEABLE BODIES

BACKGROUND OF THE INVENTION

1. Field of the Invention.

The present invention generally relates to a method and apparatus for introducing a fluid into pierceable, fluid-permeable bodies, and more specifically the invention relates to injection of brine, pickle, or another curing or treating liquid into meat bodies, such as hog bellies, bacon slabs, or the like.

2. Description of the Prior Art.

Apparatuses of the above type are for example disclosed in U.S. Pat. Nos. 2,641,990, 2,645,172, and 2,674,179. However, injection and distribution of brine in meat bodies obtainable by means of these known apparatuses has proved unsatisfacotory for some purposes, because the amount of brine injected and the distribution thereof may vary too much as well from one region to another in each of the meat bodies treated as from one of the treated meat bodies to another.

Some of the said known apparatuses are provided with hollow needles each having a pattern of brine discharge openings arranged over a substantial part of their length. These needles are moved into penetrating engagement with the meat bodies being treated, and when the needles have reached their lowest position the needle movement is interrupted by a dwell period before the upward movement of the needles out of engagement with the meat bodies is initiated. In the said prior art apparatuses most of the brine or curing liquid is injected into the meat during the said dwell period, but to some extent also during the up- and downward movement. The known apparatuses comprise stripping devices for stripping the meat bodies off the needles when the latter are moved upwardly. However, in case meat bodies of slightly varying size being moved under the needles in side-by-side relationship are being treated, the known stripping devices allow some of the meat bodies to move varying distances upwardly along with the needles in their longitudinal direction, even when the stripping devices are properly adjusted. It should also be noted that treatment of different parts of meat bodies having different sizes may require replacement of the needles, because the length of the needle parts provided with the pattern of brine discharge openings should substantially correspond to the maximum height of the meat bodies to be treated.

The above described known brine injection technique and stripping devices inherently involve substantial variation in the amount of fluid injected in each weight unit of the meat bodies treated, and it has been found that a substantially more uniform distribution of brine or another curing liquid in meat bodies or other fluid-permeable bodies may be obtained by improving the fluid injection technique and/or the known stripping devices.

SUMMARY OF THE INVENTION

According to the present invention a method for introducing a fluid into pierceable, fluid-permeable bodies has been provided, said method comprising moving said bodies along a predetermined path, reciprocating an assembly of hollow needles between a first position in which they penetrate into bodies aligned transversely with respect to said predetermined path, and a second position, in which said needles are out of engagement with said bodies, the movement from said first to said second position being commenced substantially immediately after reaching said first position, supplying said fluid under pressure into the bodies penetrated by said needles through one or more discharge openings defined in each of said needles, all of said discharge openings in each needle being positioned in a longitudinal needle section having an axial length being negligible compared to the average height of said bodies, and substantially preventing each of said bodies penetrated by said needles from being displaced in the longitudinal direction of said needles while the latter are being moved from their first to their second position.

Each of the needles may have a single fluid discharge opening or a number of discharge openings concentrated adjacent to the pointed free end of the needle. According to the invention the needles have almost no dwelling period in said first position in which the needles are penetrated into the pierceable bodies. Provided that the movements between said second and said first positions and vice versa are performed at fairly uniform rates it is possible to obtain a substantial improvement of the fluid distribution in the meat bodies treated. By effectively preventing all of the bodies from being moved by the needles in their longitudinal direction an undesirable and uncontrollable prolongation of the fluid injection period which might adversely affect the desired uniform fluid distribution is avoided.

The principles of this invention may generally be used in connection with injection of any type of fluid, such as gas or liquid, into any type of pierceable, fluid-permeable bodies. However, the invention is believed to be especially useful in connection with the injection of a curing liquid, such as brine, into meat bodies, such as bacon slabs and hog bellies.

In order to avoid useless discharge of fluid from the needles to the highest possible extent when the needles are out of engagement with the pierceable bodies, the supply of fluid or brine to the needles may be started when under their movement from said second to said first position the needle points have reached a level corresponding substantially to the maximum height of the meat bodies, and the supply of brine or fluid may be interrupted when the needle points reach substantially the same level under their movement from said first to said second position.

The invention also relates to an apparatus for introducing a fluid into pierceable, fluid-permeable bodies, said apparatus comprising a conveyor for moving said bodies along a predetermined path, a plurality of substantially parallel hollow needles extending transversely to said conveyor and having fluid discharge openings, means for supplying pressure fluid into said hollow needles, means for reciprocating said needles between a first position in which they penetrate into bodies aligned transversely with respect to said predetermined path, and a second position in which said needles are out of engagement with said bodies, and a number of stripping members arranged in side-by-side relationship above said conveyor and each extending in the longitudinal direction thereof, said stripping members being separately movable up and down in relation to said conveyor in order to allow said bodies to pass between said conveyor and said stripping members, said stripping members being adapted to substantially prevent said bodies from being moved out of engagement with said conveyor by said needles when they move from their first to their second position.

The separately movable stripping members may sense the varying height of the bodies moved side-by-side by said conveyor, and thus due to their resistance to upward movement away from the conveyor (for example due to spring bias, weight, or inertia) effectively retain the pierceable bodies or meat bodies in contact with the conveyor during the reciprocating needle movement.

During operation of the apparatus according to the invention one or more of the hollow needles may become clogged by meat particles or other particles of solid material in the curing liquid. Such condition will, of course, adversely affect the uniform distribution of curing liquid in the meat bodies being treated. Therefore, according to the invention the apparatus may comprise means for indicating when any of the hollow needles have become partly or completely clogged up.

In case replacement of the clogged needle or needles is relatively laborious the operator of the apparatus will be temptated to put off such replacement. Therefore, the apparatus according to the invention is advantageously provided with a needle assembly comprising a needle holder mechanism by means of which at least a number of and preferably all of the needles in the said assembly may simultaneously be released or clamped by a relatively simple operation.

BRIEF DESCRIPTION OF THE DRAWINGS

A preferred embodiment of the apparatus according to the invention will now be described more in detail with reference to the drawings wherein FIG. 3 is a fragmentary perspective view illustrating the function of the stripping members, FIGS. 4 and 5 are perspective views of the mechanisms and devices arranged at the top of the needle actuating cylinder, the means for controlling supply of brine to the needles being shown in two different positions.

DESCRIPTION OF THE PREFERRED EMBODIMENTS

Figure 1:
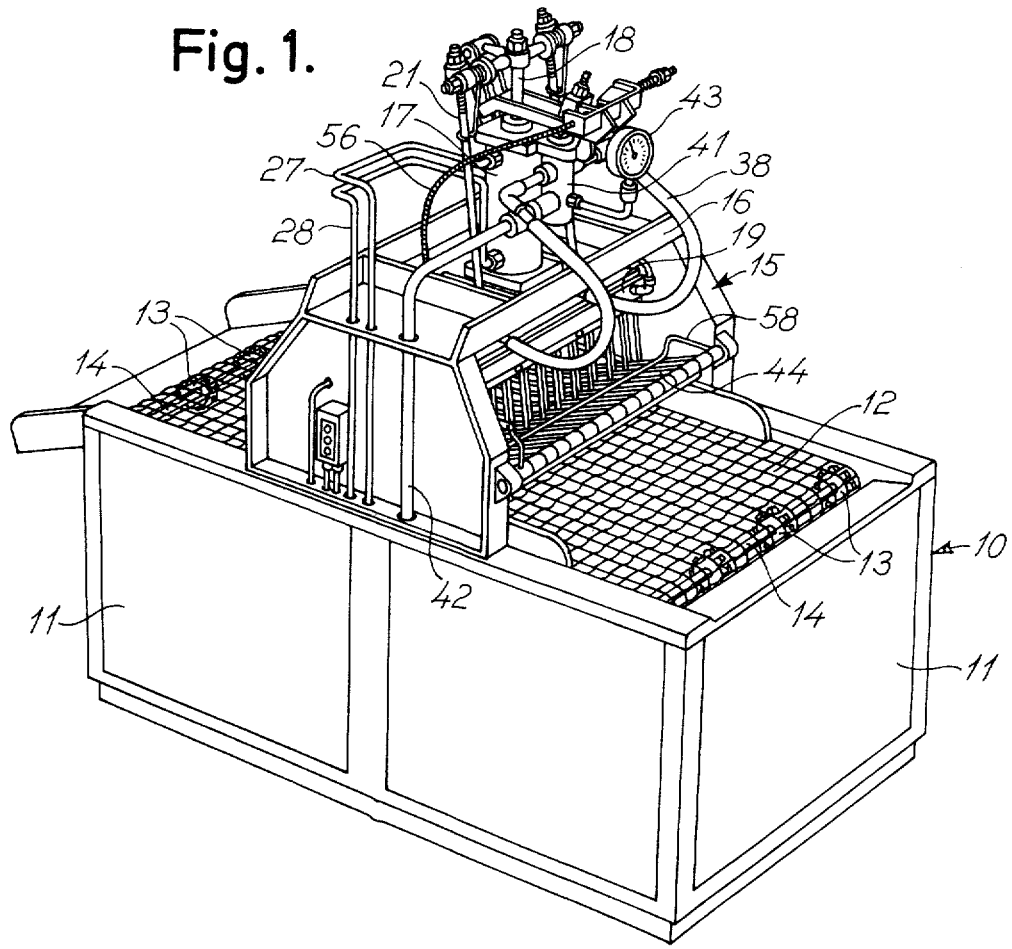
FIG. 1 is an overall perspective view of a brine injecting apparatus embodying the invention.

The apparatus shown on the drawings comprises a frame structure 10 supporting the other parts of the apparatus and adapted to rest directly on the floor. Detachable panels 11 cover openings defined by the frame structure and form a box-like housing together with the frame structure. An endless conveyor 12 has an upper run extending substantially horizontally at the top opening of the housing formed by the frame structure 10 and the panels 11. The conveyor 12 is passed over sprockets 13 mounted on transversely extending shafts 14 rotatably mounted at each end of the frame structure as shown in FIG. 1. The conveyor 12 is driven by driving means (not shown) which is preferably arranged within the housing 10, 11. The apparatus shown on the drawings may be an improvement of the apparatus marketed by Allbright-Nell Company, Chicago under the designation "Pickle injector ANCO 991-H", and thus conveyor driving means may be of the same type as those used in connection with the said known pickle injector or similar to those disclosed in the said US patent specifications.

The frame structure 10 comprises an inversed U-shaped bracket 15 having a horizontally extending crosspiece 16 on which a double-acting pneumatic cylinder 17 having a substantially vertically extending piston rod, is mounted. A crosshead carrying a number of downwardly, substantially parallelly extending hollow needles 20 pointed at their lower ends is connected to the piston rod 18 by means of a pair of connecting rods 21. The threaded upper end of each connecting rod 21 extends through a bore in a pivot block 22 and is adjustably secured thereto by means of nuts 23. The pivot blocks 22 are pivotally mounted on a cross shaft 24 which is rigidly secured to the piston rod 18 by means of a nut 25. Thus, the crosshead 19 with the needles 20 may perform a swinging movement in the longitudinal direction of the conveyor. However, coil springs 26 are biasing the connecting rods 21 and the crosshead 19 in a direction opposite to the moving direction of the upper run of the conveyor 12.

Figure 11:
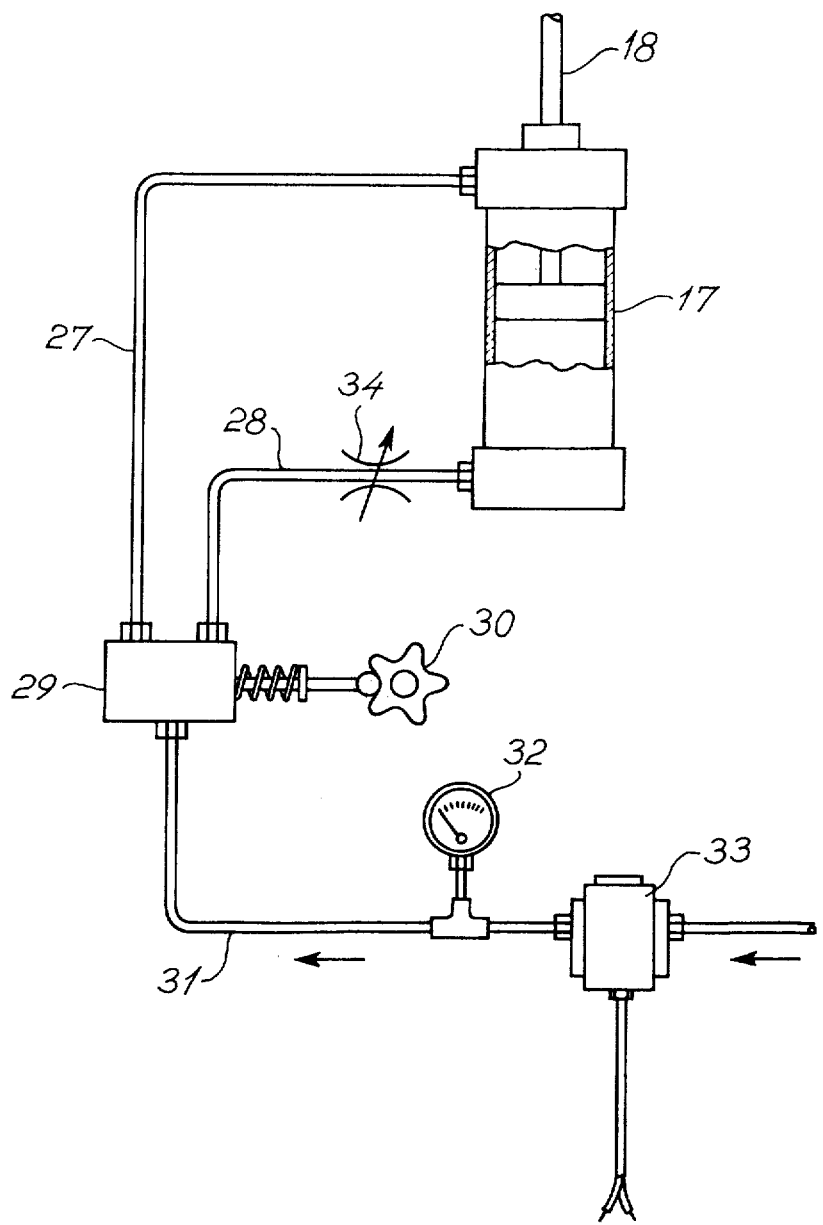
FIG. 11 is a diagram indicating the control system for the needle actuating cylinder.

The chambers of the double acting cylinder 17 may alternately be connected to a source of pressurized air (not shown) and vented to the atmosphere through conduits 27 and 28 which are connected to a control valve (FIG. 11). The valve may be actuated by a rotatable cam 30 which is driven in timed relationship with the conveyor, for example directly by the conveyor driving motor. Pressurized air is supplied to the valve 29 through a conduit 31 from said source of pressurized air. If desired, the conduit 31 may be provided with a pressure gauge or manometer 32 and/or with a pressurestat 33. Furthermore, the conduit 28 is preferably provided with a throttling or pressure controlling valve 34. As described more in detail in the following the system diagrammatically shown in FIG. 11 may reciprocate the crosshead 19 up and down so as to bring the needle 20 out of and into penetrating engagement with meat bodies 35 or the like transported by the conveyor 12 in the direction indicated by an arrow 36 in FIG. 2. The swingable arrangement of the connecting rods 21 allows the crosshead 19 to follow the movement of the meat bodies when in engagement therewith.

Figure 7:
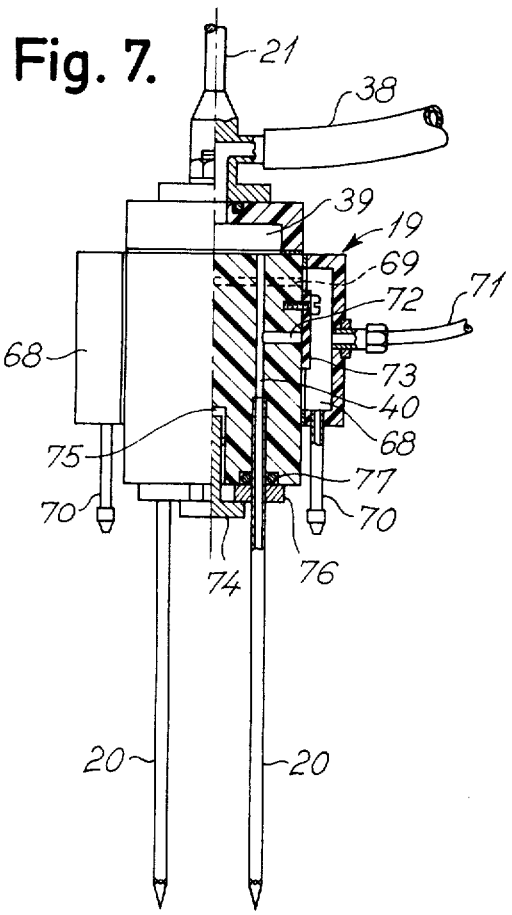
FIG. 7 is an end view and partial sectional view showing an embodiment of a needle carrying crosshead.
Figure 10:
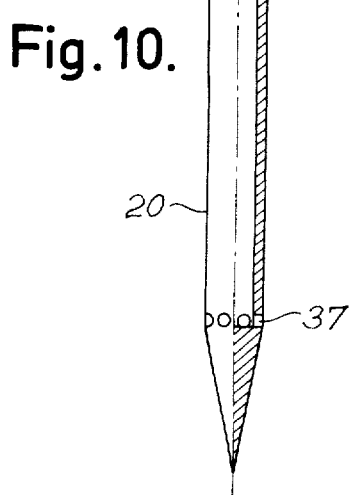
FIG. 10 is a side view and partly cross sectional view of the free end portion of an embodiment of the type of hollow needles which may be used in connection with the apparatus according to the invention.

As shown in FIG. 10 each of the hollow needles are provided with a number of discharge openings 37 arranged adjacent to the pointed end of the needle and in substantially the same radial plane. It should be understood, however, that the discharge openings may be arranged in any other manner provided that they are concentrated adjacent to the pointed end of the needle. The crosshead 19 serves as a manifold for distributing brine or curing liquid to the hollow needles 20. Brine is supplied to the crosshead through hoses or conduits 38 from which the brine is supplied to a distribution chamber 39 and to bores or passages 40 in which the upper ends of the needles 20 are mounted (FIG. 7). The hoses 38 are connected to a brine supply controlling valve 41 to which brine or another curing liquid is supplied under pressure through a conduit 42 from a suitable brine source (not shown) which may for example be of the same type as that used in connection with the above mentioned known pickle injector or that disclosed in any of said U.S. Patent Specifications. A pressure gauge or manometer 43 for indicating the brine pressure may be arranged on the controlling valve 41 as shown in FIG. 1.

Figure 6:
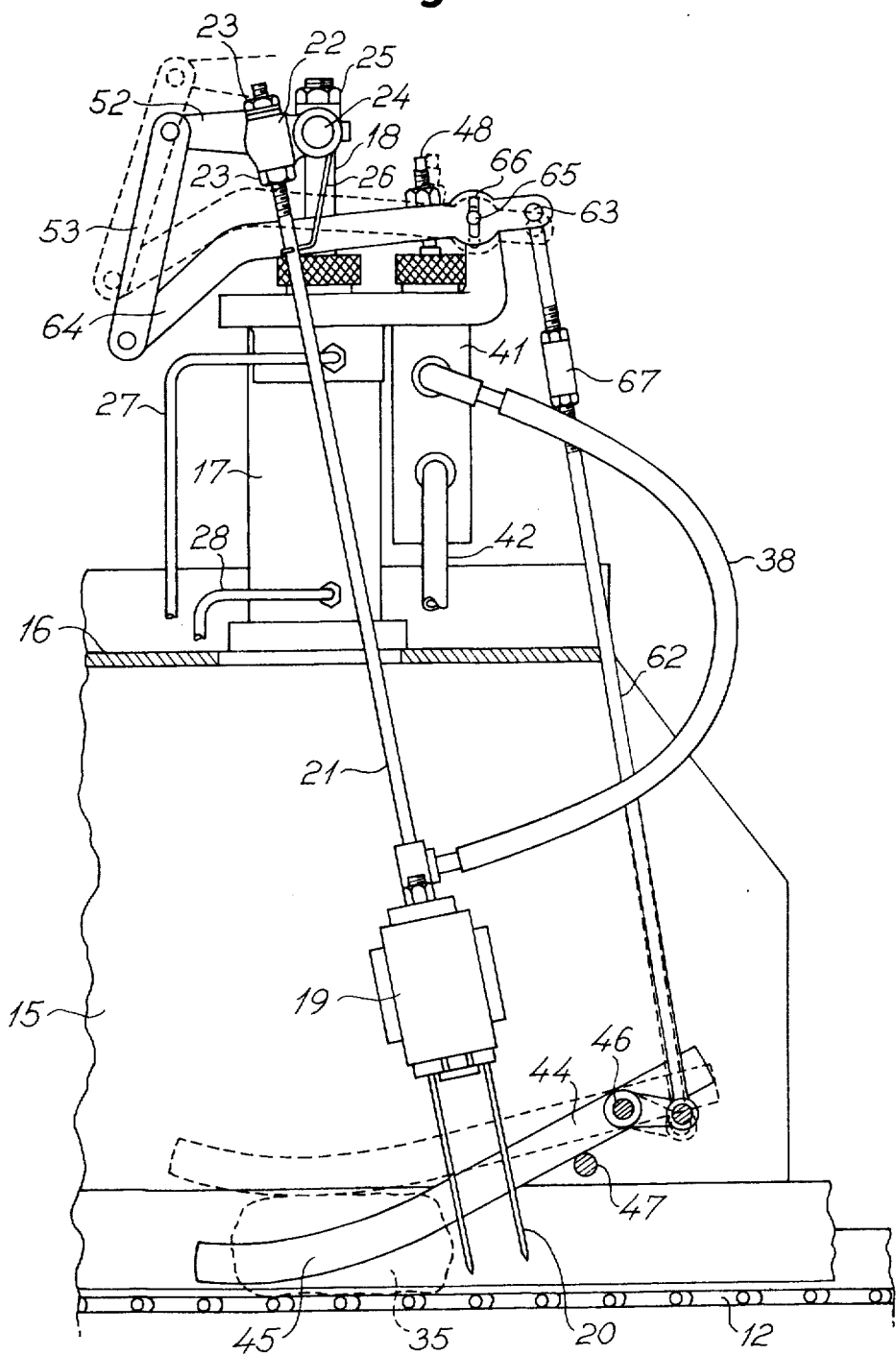
FIG. 6 is a fragmentary sectional view in the central upper part of a modified embodiment.

A stripping device 44 for preventing the meat bodies 35 from being moved upwardly together with the needles 20 during the reciprocating movement of the needles extends across the conveyor 12 between the upper run thereof and the crosshead 19. The stripping device 44 comprises a number of transversely spaced stripping arms or fingers 45 extending substantially parallel in the longitudinal direction of the conveyor 12. At one end each stripping finger 45 is provided with a hub or an eye by means of which the fingers are swingably mounted on a transversely extending common shaft 46. The fingers are preferably slightly curved at their free ends as shown in FIGS. 2, 3, and 6, and a supporting rod 47 extending transversely below the fingers 45 supports the same in their lower position in which their free ends are positioned slightly above the upper run of the conveyor 12.

The actuating member of the brine supply controlling valve 41 is in contact with an adjustable screw member 48 extending through a block member 49 (FIGS. 4 and 5) which is mounted swingably about a fixed axis represented by a stud 50. A bifurcated lever 51 embraces the block member 49 and is also mounted swingably about the axis represented by the stud 50. An arm 52 fixed to the piston rod 18 is pivotally connected to one end of the lever 51 by a link member 53. A bracket 54 fixed to the opposite end of the lever 51 supports a wedge member 55 mounted displaceably in relation to said bracket. One end of the wedge member is connected to a tension tranmitting member such as a Bowden wire 56. When no force is transmitted through the tension transmitting member the wedge member 55 is moved to its left position (as viewed in FIGS. 4 and 5) under the action of a coil spring 57, and the wedge member may be moved to the right against the bias of the spring 57 when a pulling force is transmitted through the member 56. A U-shaped level sensing member 58 is swingably mounted on the shaft 46 by means of a pair of hub members 59, and the sensing member 58 comprices a substantially straight middle section extending transversely across and engaging with the upper surfaces of the stripping fingers 45. As shown in FIG. 3 the tension transmitting member 56 is connected to an arm 60 extending substantially radially from one of said hub members 59.

When it is desired to use the apparatus the operator starts the driving motors for example by closing an electrical switch (not shown). Thereby the conveyor 12 starts moving in the direction indicated by the arrow 36 in FIG. 2, and pressure fluid, such as brine or pickle, is supplied to the controlling valve 41 through the conduit 42. The brine pressure is controlled by suitable means so as to be maintained at a substantially constant, predetermined value which may be read on the manometer 43. Pressurized air is supplied to the control valve 29 through a conduit 31 from the pressurized air, and the air pressure which is indicated by the manometer 32 is maintained at a substantially constant value by suitable means such as the pressure control or pressurestat 33. The cam 30 is rotated in synchronism with the movement of the conveyor 12, and thereby the actuating member of the control valve 29 which comprises a cam follower is reciprocated at a rate which is dependent on the rate of movement of the conveyor 12. When the actuating member of the control valve 29 is in one end position of its reciprocating movement pressurized air is supplied through the conduit 28 to the lower chamber of the cylinder 17, and the upper chamber of the cylinder 17 is vented to the atmosphere through the conduit 27. When the actuating member is in the other end position the upper chamber of the cylinder 17 is pressurized, and the lower chamber is vented to the atmosphere. Thus, the rotating movement of the cam 30 causes a reciprocating movement of the piston and the piston rod 18 of the cylinder 17. It is advantageous to obtain a reciprocating movement of the piston rod 18 without any substantial dwelling periods in the end positions and with fairly constant rates of movement between these end positions. This may i.a. be obtained by proper adjustment of the throttling or pressure controlling valve 34.

Figure 2:
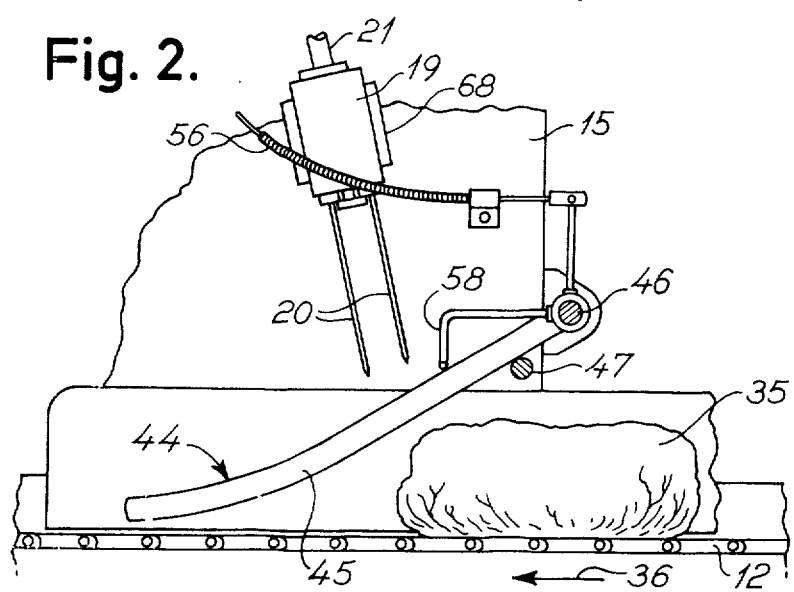
FIG. 2 is a fragmentary side view and partial sectional view illustrating in enlarged scale the functional relationship between the stripping members and the means for controlling supply of brine or other curing liquid to the hollow needles.

Meat bodies 35 into which brine is to be injected are placed on the conveyor 12 by the operator and is thereby moved to a position below the stripping fingers 45 and the crosshead 19 as illustrated in FIG. 2. The reciprocating movement of the piston rod 18 imparts a corresponding reciprocating movement to the crosshead 19 and the needles 20 so that the needles 20 are alternatingly moved into penetrating engagement and out of engagement with the meat body or meat bodies positioned under the stripping device 44. When the needles are in engagement with meat bodies the needles are entrained thereby so that a swinging movement is imparted to the crosshead 19 about the cross shaft 24. When thereafter the needles are moved out of engagement with the meat bodies the crosshead is swung back to its initial position defined by abutment means (not shown), under the influence of the coil springs 26. Thus, during operation the crosshead 19 and the needles 20 will reciprocate up and down corresponding to the movement of the piston rod 18 and simultaneously perform a reciprocating swinging movement about the axis of the shaft 24. As best seen in FIG. 3 the stripping fingers 45 are resting on the top surfaces of the meat bodies when they are being penetrated by the hollow needles. Due to the fact that the stripping fingers 45 may swing independently about the shaft 46 all of the fingers are in engagement with a meat body 35. Provided that the weight and/or inertia of the fingers 45 is properly selected the stripping device effectively prevents the meat bodies from being moved upwardly and out of engagement with the conveyor 12 when the needles 20 are moved out of engagement with the meat bodies. This is also true if the size of the meat bodies 35 being treated are varying substantially, because the flexible stripping device may adapt itself to the varying height or thickness of the meat bodies.

The reciprocating movement of the piston rod 18 is also imparted to the bifurcated lever 51 through the arm 52 and the link member 53. The wedge member 55 which is connected to the lever 51 performs a reciprocating swinging movement about the axis of the stud 50 together with the lever 51. During its reciprocating movement the wedge member 55 actuates the block member 49 and imparts a swinging movement thereto. However, there is a certain lost motion between the members 55 and 49, and the said lost motion depends on the position of the displaceable wedge member 55. It is understood that the arrangement described involves that the crosshead or needle position at which the brine supply controlling valve is opened and closed may be adjusted by displacing the wedge member 55 in relation to the bracket 54.

FIG. 3 merely illustrates that the angular position of the level sensing member 58 is determined by the uppermost stripping finger or fingers 45, i.e. the maximum height or thickness of the meat bodies 35 being treated. By means of the Bowden wire 56 the movement of the level sensing member 58 and the wedge member 55 are so interrelated that each angular position of the sensing member 58 corresponds to a predetermined position of the wedge member 55 in relation to the bracket 54. It will be appreciated that by means of the arrangement described above it is possible to obtain an automatic control of fluid or brine supply to the hollow needles 20 in such a manner that brine supply is interrupted immediately after the last needle has been moved out of engagement with the meat bodies 35, and resumed immediately before the first needle or needles are being moved into engagement with the meat bodies 35. Thereby the amount of brine to be recirculated back to the brine source may be decreased to a minimum. In case no meat bodies are being placed on the conveyor 12 the fingers 45 are moved to the position indicated by dotted lines in FIG. 3 in which position the fingers 45 rest on the supporting rod 47. In that position of the fingers 45 the wedge member 55 takes up the position shown in FIG. 5 in which it does not engage with the block member 49, and therefore, no brine will be supplied to the hollow needles 20 before at least some of the stripping fingers 45 are moved upwardly by a meat body or meat bodies.

FIG. 6 illustrates a modified embodiment of the brine supply controlling arrangement. In FIG. 6 the Bowden wire has been replaced by a rod 62 which is pivotally connected at 63 to one end of a lever 64 replacing the lever 51. The lever 64 reciprocates about the pivot 63 and is guided by a pin 65 extending through a slot 63 in the lever. The length of the rod 62 may be adjusted by adjusting means 67. When no meat bodies are engaging the stripping fingers 45 the members of the brine supply controlling system take up the position shown in solid lines in FIG. 6, and the actuating member of the valve 41 is not engaged by the adjustable screw member 48, so that no brine is supplied to the needles. In case a meat body or meat bodies are passed under the stripping fingers 45 the members of the brine supply controlling system take up the position indicated by dotted lines. It is noted that the pivot 63 is moved downwardly so that the valve 41 is now opened and closed during the reciprocating movement of the lever 64.

By means of the apparatus described above it is possible to obtain an improved uniformity of distribution of brine in the meat bodies treated. It is, however, a condition that the flow characteristics of the needles 20 are uniform so that substantially the same amount of curing liquid or brine is discharged from each needle during operation of the apparatus. However, from time to time one or more of the needles become clogged up by meat fibres or other solid particles entrained by the brine.

The apparatus may, however, be provided with some kind of means for indicating when a needle has become clogged up, so that the needle may immediately be replaced.

FIG. 7 shows an embodiment of such clogging indicating means. The crosshead 19 shown in FIG. 7 comprises air chambers 68 extending along the length of the crosshead, and the said chambers are interconnected by means of a transverse bore 69. Each of the chambers are vented to the atmosphere through a nozzle 70, and pressurized air is supplied to the right hand chamber 68 through a conduit or hose 71. Each of the needle bores 40 are connected to the adjacent air chamber 68 through a transverse bore 72 which is controlled by a non-return valve 73. The valve 73 may be of the simple type comprising a sheet member of rubber or plastic or a similar flexible material having one edge portion fastened to the adjacent surface of the crosshead, for example by means of a screw as indicated in FIG. 7. The air pressure within the chambers 68 is adjusted so in relation to the brine pressure in the bores 40 and 72 that the valve 73 is closed under normal operation conditions. However, when a needle has become clogged up the resultng pressure increase in the corresponding bore 40 results in opening of the valve 73 so that curing liquid or brine may escape into the air chamber 68 and out through the nozzle 70. Thus, the presence of drops of liquid in the air flow from the nozzles 70 indicates that the flow characteristics in one or more of the needles 20 have been changed.

Figure 8:
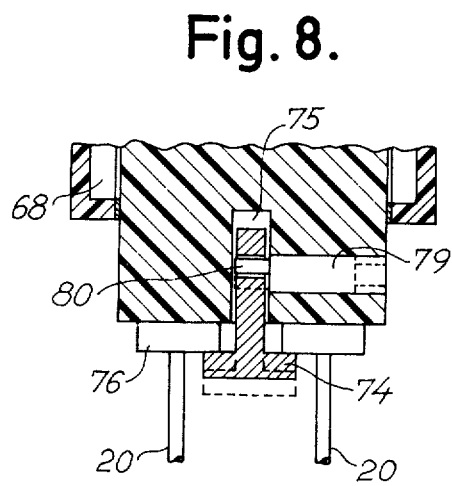
FIG. 8 is a fragmentary cross sectional view of the lower part of the crosshead shown in FIG. 7.
Figure 9:
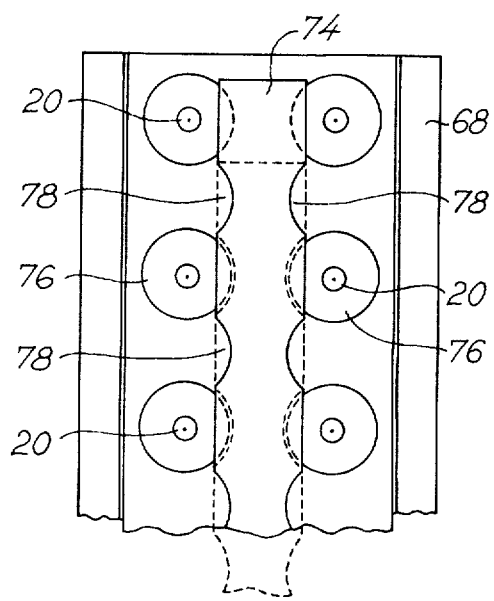
FIG. 9 is a bottom view of the crosshead shown in FIGS. 7 and 8.

FIGS. 8 and 9 illustrate a mechanism facilitating replacement of needles. The said mechanism comprises a clamping member having a T-shaped cross section.

The stem portion of the T-shaped member 74 is received in an open channel or slot 75 in the bottom part of the cross head 19. The end portions of the needles 20 are received in enlarged parts of the bores 40, and each needle is provided with an annular flange or collar 76 engaging a O-ring or another gasket member 77 arranged in an annular recess surrounding each of the bores 40 (FIG. 7). As shown in FIG. 8 the needle collars 76 are clamped between the bottom surface of the crosshead 19 and the flanges of the clamping member 74. As shown in FIG. 9 these flanges have longitudinally spaced and oppositely arranged cut outs 78 formed as segments of a circle. A bolt or stud member 79 having an eccentric member 80 at its inner end is rotatably mounted in the crosshead 19 in such a manner that the eccentric member engages an elongated slot formed in the stem portion of the T-shaped member 74. When desired, the outer end of the bolt member 79 may be brought into engagement with a key or another suitable tool (not shown) and rotated. In FIG. 8 the bolt member 79 is shown in such an angular position that the eccentric member is in its uppermost position. In that position the member 80 forces the clamping member upwardly so as to clamp the collars 76 between the bottom surface of the crosshead 19 and the flanges of the clamping member 74. When one or more of the needles should be replaced the bolt member 79 is rotated approximately 180° by means of said tool whereby the eccentric member 80 and the clamping member 74 are lowered. The clamping member may now be displaced in its longitudinal direction till the cut outs 78 register with the needle collars 76 as indicated with dotted lines in FIG. 9. Any of the needles 20 may then be separated from the crosshead 19.

I claim:

1. An apparatus for introducing a fluid into pierceable, fluid-permeable bodies, said apparatus comprising
   a. a conveyor for moving said bodies along a predetermined path,
   b. a plurality of substantially parellel hollow needles extending transverse to said conveyor and having fluid discharge openings,
   c. means for supplying pressure fluid into said hollow needles,
   d. means for reciprocating said needles between a first position in which they penetrate into bodies aligned transversely with respect to said predetermined path, and a second position in which said needles are out of engagement with said bodies,
   e. a number of stripping members arranged in side-by-side relationship above said conveyor and each extending in the longitudinal direction thereof, said stripping members being separately and independently movable up and down in relation to said conveyor in order to allow said bodies to pass between said conveyor and said stripping members, said stripping members substantially preventing said bodies from being moved out of engagement with said conveyor by said needles when they move from their first to their second position,
   f. means for controlling said fluid supply means so as to start supply of fluid to said needles in a third position thereof between said second and first positions aand approximately at the point of penetration by said needles, and to interrupt supply of fluid in a fourth needle position between said first and second positions and approximately at the point of disengagement by said needles,
   g. means for adjusting said third and fourth positions along the stroke of the reciprocating movement of the needles and sensing means engaging said stripping members and controlled by the immediate position of the uppermost of said stripping members to operate said means for adjusting said third and fourth positions.

2. An apparatus according to claim 1, wherein all of said fluid discharge openings in each needle are positioned adjacent to the pointed end of the needle, said reciprocating means being adapted to commence movement of the needles from the said first position substantially immediately after reaching that position.

3. An apparatus according to claim 1, wherein said stripping members comprise elongated stripping levers or fingers independently rockable about a common axis extending transversely to said predetermined path.

4. An apparatus according to claim 1, wherein said control means comprise a fluid valve and valve actuating means movable in relation to said valve into and out of an actuating position in correspondence with the reciprocating needle movement, said actuating means comprising a wedge-shaped member displaceable in response to the position of said uppermost stripping member.

5. An apparatus according to claim 4, wherein said adjusting means comprises a vertically movable abutment member extending transversely in relation to and above said stripping members, and connecting means connecting said abutment member with said wedge-shaped member so as to displace said last-mentioned member in response to the vertical movement of said abutment member produced by said uppermost stripping member.

6. An apparatus for introducing a fluid into pierceable, fluid-permeable bodies, said apparatus comprising
   a. a conveyor for moving said bodies along a predetermined path,
   b. a plurality of substantially parallel hollow needles extending transverse to said conveyor and having fluid discharge openings,
   c. means for supplying pressure fluid into said hollow needles,
   d. means for reciprocating said needles between a first position in which they penetrate into bodies aligned transversely with respect to said predetermined path, and a second position in which said needles are out of engagement with said bodies,
   e. a number of stripping members arranged in side-by-side relationship above said conveyor and each extending in the longitudinal direction thereof, said stripping members being separately movable up and down in relation to said conveyor in order to allow said bodies to pass between said conveyor and said stripping members, said stripping members being adapted to substantially prevent said bodies from being moved out of engagement with said conveyor by said needles when they move from their first to their second position,
   f. means for indicating clogging of one or more of said hollow needles, said indicating means comprising a chamber with a discharge opening or channel, a conduit for connecting said chamber with a source of pressurized gas, conduit means connecting said chamber with one or more of said hollow needles, and a non-return valve controlling said conduit means so as to allow fluid to flow from said hollow needles into said chamber and out of said discharge channel when one or more of said needles are clogged.

7. An apparatus for introducing brine or a similar fluid into meat bodies, said apparatus comprising
   a. a conveyor for moving said meat bodies along a predetermined path,
   b. a plurality of substantially parallel hollow needles extending transverse to said conveyor, each needle having brine discharge openings which are all positioned adjacent to the pointed end of the needle,
   c. means for supplying brine under pressure into said hollow needles,
   d. means for reciprocating said needles between a first position in which they penetrate into meat bodies aligned transversely with respect to said predetermined path, and a second position in which said needles are out of engagement with said bodies, said reciprocating means being adapted to commence movement of the needles from the said first position substantially immediately after reaching that position, e. stripping means arranged above said conveyor so as to allow said bodies to pass between said conveyor and said stripping means which substantially prevent said bodies from being moved out of engagement with said conveyor by said needles when they move from their first to their second position, said stripping means comprising a number of stripping members arranged in side-by-side relationship and each extending in the longitudinal direction of the conveyor, said stripping members being separately and independently movable up and down in relation to said conveyor when engaged by the meat bodies passing beneath them, and f. means for controlling said brine supply means so as to start supply of brine to said needles in a third position thereof between said second and first positions and approximately at the point of penetration by said needles, and to interrupt supply of brine in a fourth needle position between said first and second positions and approximately at the point of disengagement by said needles, g. means for adjusting said third and fourth positions along the stroke of the reciprocating movement of the needles and sensing means engaging said stripping members and controlled by the immediate position of the uppermost of said stripping members to operate said means for adjusting said third and fourth positions.

8. An apparatus according to claim 7, wherein said control means comprise a brine valve and valve actuating means movable in relation to said valve into and out of an actuating position in correspondence with the reciprocating needle movement, said actuating means comprising a wedge-shaped member displaceable in response to the position of said uppermost stripping member.

9. An apparatus according to claim 8, wherein said adjusting means comprise a vertically movable abutment member extending transversely in relation to and above said stripping members, and connecting means connecting said abutment member with said wedge-shaped member so as to displace said last-mentioned member in response to the movement of the abutment member produced by said uppermost stripping member.

10. An apparatus according to claim 9, further comprising means for indicating clogging of one or more of said hollow needles.

11. An apparatus according to claim 10, wherein said indicating means comprise a chamber with a discharge opening or channel, a conduit for connecting said chamber with a source of pressurized gas, conduit means connecting said chamber with one or more of said hollow needles, and a non-return valve controlling said conduit means so as to allow brine to flow from said hollow needles into said chamber and out of said discharge channel when one or more of said needles are clogged.

12. An apparatus according to claim 11, wherein said hollow needles form part of a needle assembly, said assembly comprising a. a needle holder body having a surface with a number of needle receiving bores, b. a plurality of hollow needles having end portions removably received in said bores and abutment means extending radially in relation to the respective needle and limiting the insertion thereof in the respective bore, c. a retaining member, and d. clamping means for releaseably clamping said abutment means between said holder body and said retaining member.

13. An apparatus according to claim 12, wherein said bores in said holder body are arranged along at least one pair of spaced, substantially parallel extending lines, said retaining member extending between said parallel lines and being displaceable along said lines from a retaining position to a releasing position and vice versa when said clamping means are released, said retaining member being shaped so as to cover at least part of each of said abutment means in said retaining position and so as to completely uncover all of said abutment means in said releasing position.

14. An apparatus according to claim 13, wherein said retaining member is an elongated member having a substantially T-shaped cross section, the stem portion of said retaining member being received in a corresponding open channel or slot extending between and along said parallel lines, and the web portions of said T-shaped retaining member covering said abutment means in said retaining position.

15. An apparatus according to claim 14, wherein said abutment means comprise an annular collar or flange arranged on each of said needles.

16. An apparatus according to claim 15, wherein said clamping means comprise at least one shaft or stub member rotatably mounted in a bore in said holder body and extending transversely to and intersecting said channel or slot, said shaft or stub member having at its inner end an eccentric member received in a longitudinally extending slot or elongated opening in the stem portion of said T-shaped retaining member.

* * * * *